A. H. SHREFFLER.
Corn-Shellers.

No. 155,045.                                Patented Sept. 15, 1874.

Witnesses.
Harry King.
S. M. Pool.

Inventor:
A. H. Shreffler.
By his attys.
Dodge & Son.

UNITED STATES PATENT OFFICE.

ANDREW H. SHREFFLER, OF JOLIET, ILLINOIS.

IMPROVEMENT IN CORN-SHELLERS.

Specification forming part of Letters Patent No. 155,045, dated September 15, 1874; application filed May 14, 1873.

*To all whom it may concern:*

Be it known that I, ANDREW H. SHREFFLER, of Joliet, in the county of Will and State of Illinois, have invented certain Improvements in Corn-Shelling Machines, of which the following is a specification:

My invention relates to that class of shellers in which the corn is passed between toothed wheels; and consists in the employment of an eccentric rotating shaft, provided with beaters or blades, and a shaft, provided with beveled blades, to feed the ears to the shelling mechanism, and in concave shields to prevent the return of the ears, &c., as hereinafter fully explained.

Figure 1:
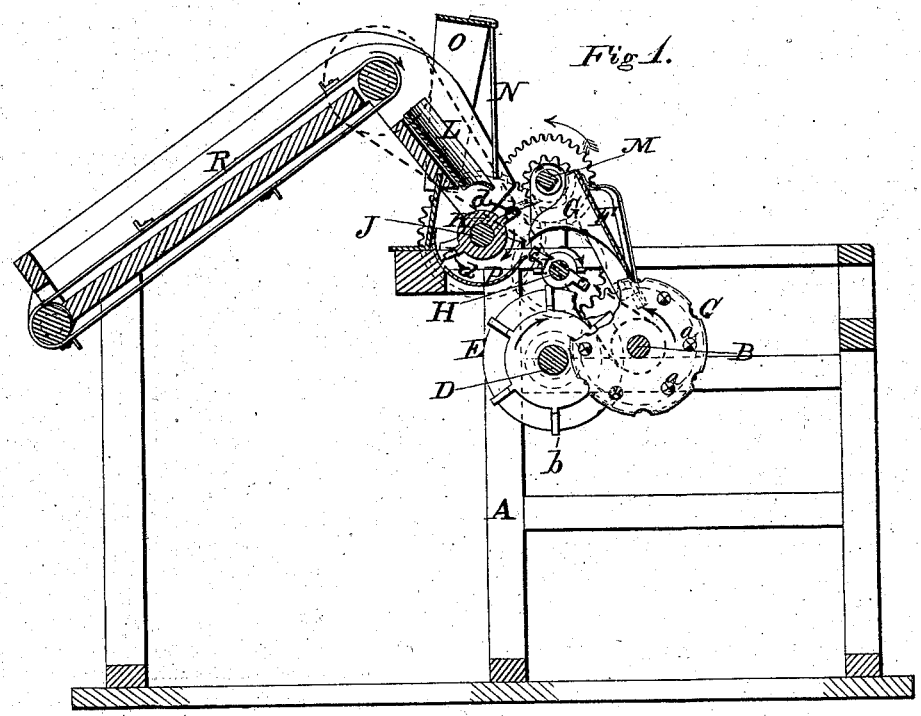
Figure 2:
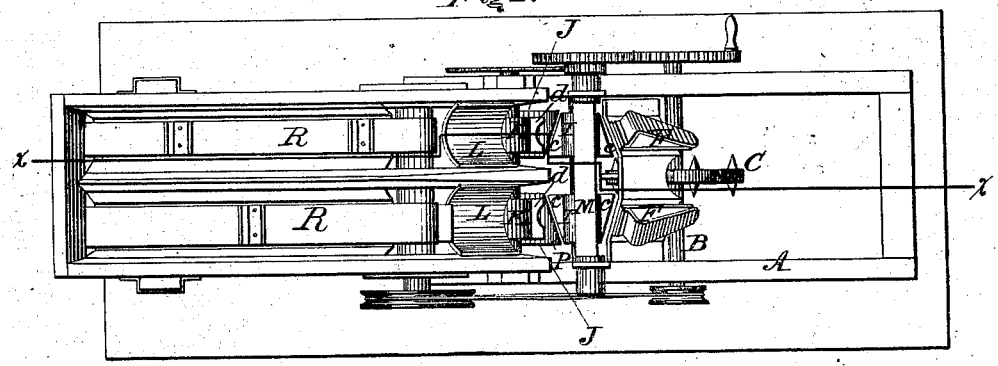

Figure 1 is a vertical longitudinal section of my machine on the line $x\ x$ of Fig. 2; Fig. 2, a top-plan view of the machine with the hinged plates or wings removed; and Fig. 3, a face view of the shelling-wheels and beveled feeding-blades.

A represents the main frame; B, a transverse shaft mounted in the frame, and provided at the middle with a wheel or disk, C, having toothed sides or faces; D, a second transverse shaft, provided with two wheels, E, on opposite sides of the wheel C, having their outer edges beveled inward, and provided with ribs or teeth $b$; F, spring-throats to hold and guide the corn; and G, a division-plate secured in the throats to guide the ears of corn down on opposite sides of the wheel or disk C.

The above-mentioned parts constitute the shelling mechanism of an ordinary double machine, and form no part of my invention.

Figure 3:
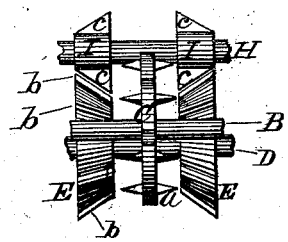

Above the beveled wheels E, I mount a transverse shaft, H, provided with two hubs, I, one over each of said wheels. Each of the hubs is formed with two short arms or blades, $c$, the ends of which are beveled to correspond with the faces or edges of the wheels, and arranged to revolve close thereto, as shown in Figs. 2 and 3. Above and slightly forward of the shaft H, I mount another transverse shaft, J, provided with two hubs, K, which are arranged opposite or in line with the hubs I, and each formed with two arms or blades, $d$, each arm having a notch or recess in the outer end. Above the hubs J, I mount the two inclined chutes or troughs L, to guide the corn into the machine. These chutes terminate just above the hubs K, which, it will be seen, are in the under or outer sides of the inlets or throats of the machine, so that all the ears of corn pass over them in entering the machine. Across the inside of the spring-throats F, at their upper ends, and above the shaft J, I mount a rotating shaft or bar, M, arranged eccentrically to its journals or axes, as shown in Figs. 1 and 2. Opposite, or in front of, each of the chutes L, I suspend, by hinges, a plate or wing, N, the lower end of which ordinarily stands close to the lower end of the chute. These plates are hinged to a detachable frame or support, O, so that when necessary they may be detached, in order to give access to the interior mechanism of the machine. Under each of the hubs K, I mount a semicircular or concave shield or guard, P, to prevent cobs, nubbins, and other obstructions from being carried back again into the machine by the blades or wheels.

The corn is fed to the machine, as usual, by an endless apron or elevator, R, as shown. The various shafts are provided with wheels, which gear into each other, as shown, so that the parts are revolved in the directions indicated by the arrows, and all tend to carry the corn downward into the machine.

When the machine is in operation, the ears of corn delivered by the apron or elevator slide down endwise in the chutes L under the plates or blades N, which serve to hold them in the upright position, to guide them down into the machine, and to prevent them from tipping over endwise. As the ears pass over the lower ends of the chutes each one is caught and carried downward by the rotating notched blades or beaters $d$. In case, as sometimes happens, an ear instead of passing down stands upright, the eccentric bar or shaft will tip its upper end back so that it will be caught and carried down by the other devices.

It will be observed that the eccentric bar or shaft does not act upon all ears and form a part of the regular feeding mechanism, but that it only serves to release and start those ears which may stop, so that they will be caught and carried down by the feeding mechanism. As the ears are passed down by the notched blades or beaters they pass over the beveled rotating blades c, which, acting under them, aid in carrying them into the spring-throats between the toothed wheels, which remove the corn in the ordinary manner. The chutes or troughs and the hinged plates guide the ears in endwise with perfect certainty and regularity, and then, by the joint action of the beaters, the eccentric shaft, and the beveled knives, the ears are carried into the shelling mechanism with precision and certainty, so that there is no danger whatever of the corn wedging and choking the inlet, of its failing to feed for other reasons, or of the shelling mechanism being clogged by an excessive quantity of corn being forced into it.

I am aware that machines have been heretofore constructed in which revolving blades were used to force the ears of corn into the machine when two or more becomes wedged together in the throat; and, also, that revolving blades have been used to throw crowding ears from the machine; but in my machine each and every ear is carried separately into the machine, so that there can be no crowding.

It is obvious that the hubs I and K may have one, two, three, or any other suitable number of arms or beaters.

I am aware that a hinged gate has been used in connection with a hopper, into which the ears of corn were thrown promiscuously, and from which they were allowed to roll sidewise against a cylinder; also, that a shaft having curved arms has been used, in connection with such a hopper, for the purpose of feeding the ears sidewise to the shelling-cylinder; and, therefore, I do not claim either of these, my improvements having relation only to that class of machines which have the ears fed endwise to the shelling wheels or disks.

What I claim, therefore, is—

1. The shaft K, provided with the arms or beaters d, located under the inclined chutes L, in combination with the eccentric shaft M, arranged above and in front of the chutes, substantially as described, for insuring a more perfect and uniform feeding of the ears to the shelling-wheels, as set forth.

2. The combination of the beaters d, concave P, and shelling-wheels C and E, arranged in relation to each other, substantially as shown and described, whereby the concave prevents the cobs from being thrown or forced back into the feeding mechanism, as set forth.

ANDREW H. SHREFFLER.

Witnesses:
ANDREW F. DICE,
JEREMIAH OSSMAN.